(12) United States Patent
Walter et al.

(10) Patent No.: US 8,577,522 B2
(45) Date of Patent: Nov. 5, 2013

(54) METHOD FOR MONITORING AT LEAST ONE SYSTEM PARAMETER WHICH INFLUENCES THE OPERATING BEHAVIOUR OF VEHICLES OR TRAINS OF VEHICLES

(75) Inventors: Manfred Walter, Neufahrn (DE); Marco Nock, Feldkirchen (DE)

(73) Assignee: Knorr-Bremse Systeme fur Schienenfahrzeuge GmbH, Munich (DE)

( * ) Notice: Subject to any disclaimer, the term of this patent is extended or adjusted under 35 U.S.C. 154(b) by 352 days.

(21) Appl. No.: 12/988,756

(22) PCT Filed: Jun. 4, 2009

(86) PCT No.: PCT/EP2009/003993
§ 371 (c)(1),
(2), (4) Date: Oct. 20, 2010

(87) PCT Pub. No.: WO2009/149862
PCT Pub. Date: Dec. 17, 2009

(65) Prior Publication Data
US 2011/0077815 A1 Mar. 31, 2011

(30) Foreign Application Priority Data
Jun. 13, 2008 (DE) .......................... 10 2008 028 264

(51) Int. Cl.
*B60W 50/02* (2012.01)
*B60T 7/12* (2006.01)

(52) U.S. Cl.
USPC ........................................... 701/19; 701/30.1

(58) Field of Classification Search
USPC ................. 701/19, 20, 36, 45, 48, 29.1, 29.3, 701/30.1–30.3, 30.5, 30.8, 30.9, 31.1, 32.7, 701/32.9, 33.8, 33.9; 246/167 R, 169 R, 246/182 R
See application file for complete search history.

(56) References Cited

U.S. PATENT DOCUMENTS

| 5,744,707 A * | 4/1998 | Kull ................................ 73/121 |
| 6,085,127 A * | 7/2000 | Vos .................................. 701/4 |
| 7,263,475 B2 * | 8/2007 | Hawthorne et al. ............... 703/8 |
| 8,494,708 B2 * | 7/2013 | Bechtler et al. .............. 701/30.3 |

(Continued)

FOREIGN PATENT DOCUMENTS

| DE | 198 27 271 | 12/1999 |
| DE | 199 53 677 | 6/2001 |

(Continued)

OTHER PUBLICATIONS

Transmittal of International Preliminary Report on Patentability for International Application No. PCT/EP2009/003993 and Written Opinion.

(Continued)

*Primary Examiner* — Khoi Tran
*Assistant Examiner* — Jason Holloway
(74) *Attorney, Agent, or Firm* — Barnes & Thornburg LLP

(57) ABSTRACT

A method monitors at least one system parameter which influences an operating property of vehicles or trains of vehicles, using an adaptable theoretical model which generates a theoretical behavior of a vehicle or train of vehicles from operating data of the vehicle or train of vehicles. The method includes determination of a real behavior of a vehicle or train of vehicles from operating data such as acceleration and/or deceleration of the vehicle or of the train of vehicles, comparison of the real behavior of the vehicle or train of vehicles with the theoretical behavior of the vehicle or train of vehicles, and monitoring of the system parameter by the theoretical model if the theoretical behavior of the vehicle or train of vehicles corresponds to the real behavior of the vehicle or train of vehicles.

14 Claims, 1 Drawing Sheet

(56) References Cited

U.S. PATENT DOCUMENTS

| | | | |
|---|---|---|---|
| 2003/0105561 A1* | 6/2003 | Nickles et al. | 701/19 |
| 2004/0093196 A1* | 5/2004 | Hawthorne et al. | 703/8 |
| 2006/0052913 A1* | 3/2006 | Kane et al. | 701/19 |
| 2007/0067078 A1* | 3/2007 | Salman et al. | 701/34 |
| 2008/0281477 A1* | 11/2008 | Hawthorne et al. | 701/19 |
| 2009/0118970 A1* | 5/2009 | Daum et al. | 701/102 |
| 2010/0204857 A1* | 8/2010 | Forrest et al. | 701/19 |

FOREIGN PATENT DOCUMENTS

| | | |
|---|---|---|
| EP | 1 389 573 | 2/2004 |
| EP | 1 900 597 | 3/2008 |
| GB | 2 378 248 | 2/2003 |
| WO | 01/84105 | 11/2001 |
| WO | 2004/022406 | 3/2004 |
| WO | 2004/024531 | 3/2004 |
| WO | 2005/015326 | 2/2005 |

OTHER PUBLICATIONS

English Translation of the International Preliminary Report on Patentability for International Application No. PCT/EP2009/003993 and Written Opinion.

* cited by examiner

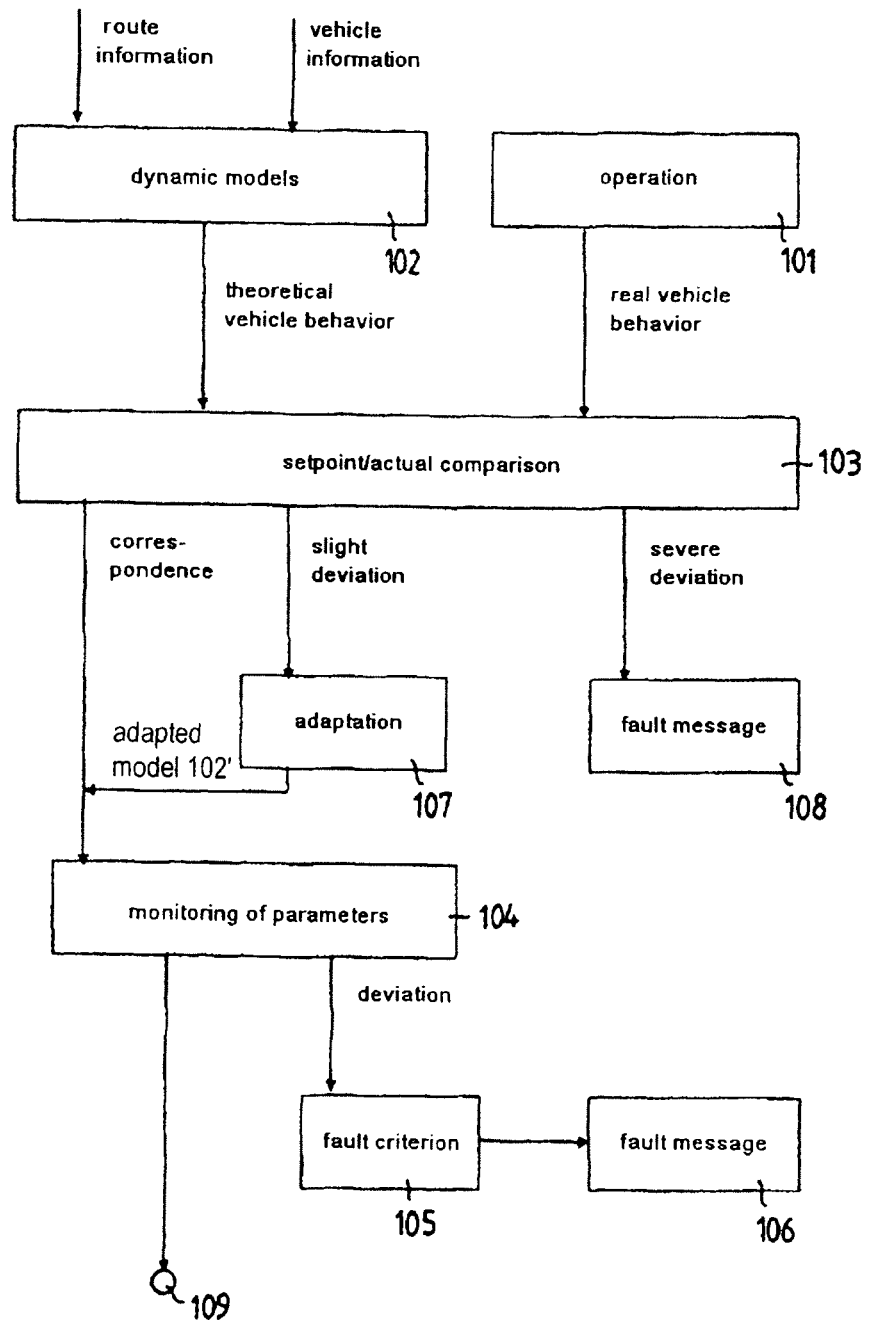

METHOD FOR MONITORING AT LEAST ONE SYSTEM PARAMETER WHICH INFLUENCES THE OPERATING BEHAVIOUR OF VEHICLES OR TRAINS OF VEHICLES

BACKGROUND

The invention relates to a method for monitoring at least one system parameter which influences an operating property of vehicles or vehicle trains.

Increasing requirements in terms of operational safety, reliability, efficiency and optimized maintenance cycles make it necessary to monitor the operating properties and the operating state of vehicles, in particular of rail vehicles. Important system parameters of rail vehicles which are to be monitored within the scope of the operating behavior are, for example, the rolling properties, the cornering behavior and the driving behavior and braking behavior.

Monitoring devices which determine the operating properties and the operating state of rail vehicles, in particular of the bogies thereof on the basis of sensors, are known from the prior art, for example from DE 198 27 271 B4. However, the wider the scope of monitoring, i.e. the more system parameters have to be monitored, the expenditure in terms of sensors becomes greater, resulting in complex monitoring devices with relatively high costs and relatively low availability.

SUMMARY

Embodiments of the disclosure make available a method for monitoring at least one system parameter which influences an operating property of vehicles or vehicle trains, which method can be implemented with relatively low expenditure.

Embodiments of the disclosure provide a method for monitoring at least one system parameter which influences an operating property of vehicles or vehicle trains using an adaptable theoretical model which generates a theoretical vehicle behavior or vehicle train behavior from operating data of the vehicle or vehicle train, containing the following operations:

c) determination of a real vehicle behavior or vehicle train behavior from operating data such as acceleration and/or deceleration of the vehicle or of the vehicle train, d) comparison of the real vehicle behavior or vehicle train behavior with the theoretical vehicle behavior or vehicle train behavior, and c1) monitoring of the system parameter by the theoretical model if the theoretical vehicle behavior or vehicle train behavior corresponds to the real vehicle behavior or vehicle train behavior and c2) if the parameter exceeds or drops below a predefined limiting value and/or lies outside a predefined limiting value range, generation of a fault message and/or generation of instructions for the vehicle driver and/or automatic initiation of countermeasures, or c3) adaptation of the theoretical model until the theoretical vehicle behavior or vehicle train behavior corresponds to the real vehicle behavior or vehicle train behavior, and if a deviation between the system parameter acquired with the original theoretical model and the system parameter acquired with the adapted theoretical model does not exceed or does not drop below a predefined limiting value and/or lies within a predefined limiting value range, continuation with step c2), or c4) generation of a fault message relating to the presence of a fault or of destruction at the vehicle, at the vehicle train and/or in the theoretical model if the deviation between the system parameter acquired with the original theoretical model and the system parameter acquired with the adapted theoretical model exceeds or drops below the predefined limiting value and/or lies outside the predefined limiting value range.

With these measures, relatively precise monitoring of vehicle system parameters is possible with reduced expenditure on sensors.

As a result of the measures provided by various embodiments of the disclosure, advantageous developments and improvements of the invention are possible.

The operating data of the vehicle or of the vehicle train also may continue to contain request signals of the driver, route data, vehicle data and the like.

According to one embodiment, the at least one system parameter which is to be monitored is a safety-relevant system parameter such as the braking power of the vehicle or of the vehicle train.

Last but not least, the initiated countermeasure may be rapid braking.

More precise details can be found in the following description of embodiments of the disclosure.

An exemplary embodiment of the invention is illustrated below in the drawing and explained in more detail in the following description. In the drawing, the single FIGURE shows a schematic flowchart of an exemplary embodiment of the method according to the disclosure.

DETAILED DESCRIPTION OF THE EMBODIMENTS

According to at least one embodiment, a method may be applied in a vehicle train composed of rail vehicles containing both any desired motorized traction vehicles and also any desired wagons which are not driven and are coupled to the traction vehicles, as well as in multiple rails units.

The method may serve for monitoring at least one system parameter which influences an operating property of the vehicle train using a theoretical dynamic model 102 which can be adapted to the real conditions.

The at least one system parameter which is to be monitored and which influences the operating behavior of the vehicle train may be a safety-relevant parameter such as, for example, the braking power of the vehicle train.

Theoretical dynamic model 102 generates a theoretical vehicle train behavior relating to the respective journey from operating data of the vehicle train. It is, therefore, possible to use the theoretical dynamic model 102 to make predictions about the vehicle train behavior as a function of the operating data, which are currently present.

These operating data contain, for example, data about the route profile (route information) and data about the vehicle train (vehicle information) such as, for example, the inclination (positive gradient, negative gradient) of the route section, the curve radii of the route section, the characteristics of the vehicle train drive, the braking behavior of the vehicle train, and the weight and the load of the vehicle train, as well as request signals of the vehicle train driver such as power request signals to the drive machine from the driving lever position or braking request signals to the brakes from the brake lever position or the brake pressure. These operating data may be known or are measured using a sensor and/or acquired using operation control technology in modern vehicles.

Furthermore, according to a method operation performed at 101. illustrated in the FIGURE, the real vehicle train behavior may be acquired during operation of the vehicle train on the basis of position and speed, for example, using Global Position System (GPS) or control technology, and the positive or negative acceleration of the vehicle train may therefore be determined. These measurements require only minimal sensor systems.

Within the scope of a further method operation performed at 103, a comparison takes place between the real vehicle behavior and the predictions of the dynamic model. For this purpose, the theoretical vehicle train behavior may be determined based on the operating data which are currently present, using the dynamic model 102.

When the theoretical vehicle behavior corresponds to the real vehicle behavior, the system parameter to be monitored may be monitored further according to the method operation performed at 104, here for example, the braking behavior of the rail vehicle train. The monitoring may be carried out here using the theoretical model 102, which, it has become apparent, sufficiently precisely models the reality up to this time. If the theoretical dynamic model is not sufficiently precise, it may be adapted at 107, for example, by virtue of the fact that the model 102 may contain self-learning algorithms.

If the monitoring by the theoretical model 102 reveals that the respective system parameter would have to be adapted as described below in such a way that it would exceed or drop below a predefined limiting value or would lie outside a predefined limiting value range within the scope of at least one fault criterion 105, a fault message 106 may be generated. In addition to or instead of the fault message, instructions for the vehicle driver can also be generated and/or countermeasures, such as, for example, rapid braking, may be automatically initiated.

Therefore, if the braking power, which may form the safety-relevant parameter which is to be monitored, lies below a threshold value of the maximum possible braking power, a fault message may be generated. In addition, a brake emergency operating program can be initiated and, for example, the maximum speed of the vehicle train can be automatically limited from a possible maximum speed to a maximum speed which is permissible in view of the reduced braking power.

On the other hand, if the continuously adapted system parameter which is monitored by the theoretical model 102 and described as below does not exceed or drop below the predefined limiting value or remains within the predefined limiting value range, the monitoring may be continued using the dynamic model until a deviation occurs (see operation at 109).

However, if there is no complete correspondence between the real vehicle behavior and the theoretical vehicle behavior, the theoretical model 102 may be adapted within the scope of an adaptation step 107 until the theoretical vehicle behavior corresponds to the real vehicle behavior. However, adaptation of the theoretical model 102 in combination with parameter monitoring may be possible only if a deviation between the parameter which is acquired with the original theoretical model 102 and the parameter which is acquired with the adapted theoretical model 102' does not exceed or drop below a predefined upper limiting value and/or lies within a predefined value range. In this case, only a slight deviation occurs between the parameter which may be acquired with the original theoretical model 102 and the parameter which may be acquired with the adapted theoretical model 102'. The process then continues with the method operations performed at 104 to 106 or 109, as described above.

If the deviation between the parameter which is acquired with the original theoretical model and the parameter which is acquired with the adapted theoretical model exceeds or drops below the predefined limiting value and/or lies outside the predefined value range, the deviation may be too large. A fault message 108 relating to the presence of a fault or disruption in the vehicle train and/or in the theoretical model 102 may then be generated.

It should be noted that not only a system parameter which influences the operating behavior of the vehicle train can be monitored with the method but also a plurality of parameters can be monitored in parallel. Last but not least, the method can be applied not only for monitoring vehicle trains but also individual vehicles such as rail vehicles and road vehicles.

The invention claimed is:

1. A method for monitoring at least one system parameter which influences an operating property of vehicles, the method comprising:
   acquiring operating data during operation of a real vehicle, the operating data being measured using at least one sensor;
   determining real vehicle behavior based on the operating data of the vehicle;
   comparing the real vehicle behavior with theoretical vehicle behavior determined using an original theoretical model; and
   monitoring the at least one system parameter if the theoretical vehicle behavior corresponds to the real vehicle behavior,
   wherein, if the at least one system parameter value lies outside a predefined parameter value range, the original theoretical model is adapted to adapt the original theoretical model to provide an adapted theoretical model until the theoretical vehicle behavior corresponds to the real vehicle,
   wherein the method further comprises generating and outputting at least one of a fault message and instructions for the vehicle driver via a vehicle driver interface and initiating at least one countermeasure, and
   wherein the method further comprises, if a deviation between the at least one system parameter acquired with the original theoretical model and the at least one system parameter acquired with the adapted theoretical model lies within a predefined deviation value range, the at least one system parameter acquired with the adapted theoretical model is monitored but no fault message, or instructions are generated until the deviation value no longer lies within the predefined deviation value range.

2. The method of claim 1, wherein the operating data of the vehicle contain request signals of at least one of the driver, route data, and vehicle data.

3. The method of claim 1, wherein the monitored at least one system parameter is a safety-relevant system parameter.

4. The method of claim 1, wherein the countermeasure is rapid braking.

5. The method of claim 3, wherein the safety-relevant system parameter is the braking power of the vehicle.

6. The method of claim 1, wherein the original theoretical model is an adaptable theoretical model configured to generate the theoretical vehicle behavior based on historical operating data of the vehicle.

7. The method of claim 1, wherein the operating data includes at least one of acceleration and deceleration of the vehicle or of the vehicle train.

8. A system for monitoring at least one system parameter which influences an operating property of vehicles, the system comprising an adaptable theoretical model configured to generate theoretical vehicle behavior from operating data of the vehicle, the system comprising:
- means for determining real vehicle behavior based on operating data of the vehicle;
- means for comparing the real vehicle behavior with the theoretical vehicle behavior;
- means for monitoring the at least one system parameter to determine if the theoretical vehicle behavior corresponds to the real vehicle behavior;
- means for generating and outputting at least one of a fault message and instructions for the vehicle driver and initiating at least one countermeasure if the at least one system parameter value lies outside a predefined parameter value range; and
- means for adapting the original theoretical model to provide an adapted theoretical model, wherein the adaptation continues until an adapted theoretical vehicle behavior corresponds to the real vehicle or vehicle,
- wherein if a deviation between the at least one system parameter acquired with the original theoretical model and the at least one system parameter acquired with the adapted theoretical model lies within a predefined deviation value range, the means for monitoring continues to monitor the at least one system parameter acquired with the adapted theoretical model without issuance of the fault message or instructions until the deviation value no longer lies within the predefined deviation value range.

9. The system of claim 8, wherein the operating data of the vehicle contain request signals of at least one of the driver, route data, and vehicle data.

10. The system of claim 8, wherein the monitored at least one system parameter is a safety-relevant system parameter.

11. The system of claim 8, wherein the initiated countermeasure is rapid braking.

12. The system of claim 10, wherein the safety-relevant system parameter is the braking power of the vehicle.

13. The system of claim 8, wherein the original theoretical model is an adaptable theoretical model configured to generate the theoretical vehicle behavior based on operating data of the vehicle.

14. The system of claim 8, wherein the operating data includes at least one of acceleration and deceleration of the vehicle.

* * * * *